(12) United States Patent
Jammes et al.

(10) Patent No.: US 12,013,504 B2
(45) Date of Patent: Jun. 18, 2024

(54) DEVICE FOR DETECTING NEUTRONS WITH IONIZATION CHAMBER AND WITH OPTICAL TRANSDUCTION COMPRISING A PLURALITY OF OPTICAL CAVITIES, EACH ACCOMMODATING THE FREE END OF AN OPTICAL FIBER

(71) Applicant: COMMISSARIAT A L'ENERGIE ATOMIQUE ET AUX ENERGIES ALTERNATIVES, Paris (FR)

(72) Inventors: Christian Jammes, Saint Paul-lez-Durance (FR); Maxime Lamotte, Pertuis (FR); Grégoire De Izarra, Aix en Provence (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/811,397

(22) Filed: Jul. 8, 2022

(65) Prior Publication Data
US 2023/0008739 A1    Jan. 12, 2023

(30) Foreign Application Priority Data
Jul. 12, 2021 (FR) .................................. 21 07542

(51) Int. Cl.
*G01T 3/00* (2006.01)
(52) U.S. Cl.
CPC .................... *G01T 3/008* (2013.01)
(58) Field of Classification Search
None
See application file for complete search history.

(56) References Cited

U.S. PATENT DOCUMENTS

| | | | |
|---|---|---|---|
| 5,519,226 A | * | 5/1996 | Copeland ................. G01T 3/06 250/390.11 |
| 5,734,689 A | * | 3/1998 | Copeland ................. G01T 3/00 376/153 |

(Continued)

FOREIGN PATENT DOCUMENTS

| | | |
|---|---|---|
| JP | 9-80160 A | 3/1997 |
| JP | 9-218270 A | 8/1997 |

(Continued)

OTHER PUBLICATIONS

French Preliminary Search Report dated Mar. 25, 2022 in French Application 21 07542 filed on Jul. 12, 2021 (with English Translation of Categories of Cited Documents), 3 pages.

(Continued)

*Primary Examiner* — Marcus H Taningco
(74) *Attorney, Agent, or Firm* — Oblon, McClelland, Maier & Neustadt, L.L.P.

(57) ABSTRACT

A device for detecting neutrons with an ionization chamber and with optical transduction includes a plurality of optical cavities, each cavity accommodating the free end of an optical fiber and having at least one inner wall coated at least partially with at least one active material. The optical cavities are filled with a gas that can be ionized by an ion arising from the reaction between a neutron and the active material. Each optical cavity is delimited by a cylinder that is closed at its longitudinal ends by a closing disk, the lateral inner wall of which is coated at least partially with an active material. The cylinders adjoin one another while being centered on the longitudinal axis. At least one of the cylinders is pierced laterally with an opening configured to allow through one of the optical fibers whose free end is accommodated in an adjacent cavity.

10 Claims, 2 Drawing Sheets

(56) References Cited

U.S. PATENT DOCUMENTS

| | | | | |
|---|---|---|---|---|
| 2012/0223242 A1* | 9/2012 | Brown | ............... | G01T 3/008 250/391 |
| 2016/0018538 A1* | 1/2016 | Bendahan | ............... | G01T 3/008 250/390.01 |
| 2018/0180750 A1 | 6/2018 | McGregor et al. | | |
| 2020/0025956 A1* | 1/2020 | Beck | ............... | G01T 3/08 |

FOREIGN PATENT DOCUMENTS

| | | |
|---|---|---|
| RU | 2 253 135 C2 | 5/2005 |
| WO | WO 2017/027679 A1 | 2/2017 |

OTHER PUBLICATIONS

Lamotte et al., "Heavy-ions Induced Scintillation Experiments", JINST 14 C09024, https://doi.org/10.1088/1748-0221/14/09/C09024, 2019, 7 pages.

Lamotte et al., "Development and First use of an Experimental Device for Fission-Induced Spectrometry Applied to Neutron Flux Monitoring", Nuclear Inst. and Methods in Physics Research, A 953, 163236, https://doi.org/10.1016/j.nima.2019.163236, 2020, 7 pages.

Lamotte et al., "Design and Irradiation Test of an Innovative Optical Ionization Chamber Technology", Nuclear Inst. and Methods in Physics Research, A 968, 163945, https://doi.org/10.1016j.nima.2020.163945, 2020, 5 pages.

Lamotte et al., "SCENA: A Simulation Tool for Radiation-Induced Gas Scintillation", Nuclear Inst. and Methods in Physics Research, A 982, 164576, https://doi.org/10.1016/j.nima.2020.164576, 2020, 11 pages.

Cheymol et al., "High Level Gamma and Neutron Irradiation of Silica Optical Fibers in CEA Osiris Nuclear Reactor", IEEE Trans. Nucl. Sci., 2008, 5 pages.

* cited by examiner

Sectional plane A

DEVICE FOR DETECTING NEUTRONS WITH IONIZATION CHAMBER AND WITH OPTICAL TRANSDUCTION COMPRISING A PLURALITY OF OPTICAL CAVITIES, EACH ACCOMMODATING THE FREE END OF AN OPTICAL FIBER

TECHNICAL FIELD

The present invention relates to the field of instrumentation, in particular for nuclear fission and fusion reactors.

More particularly, it relates to ionization-chamber neutron detectors and, in particular, neutron detectors that operate over a measurement range of multiple decades and are able to be adapted to strict installation constraints such as a sub-centimeter thimble and cable-duct diameter.

PRIOR ART

Running a reactor, whether for power or research, entails strict requirements in terms of tracking multiple operating parameters. Among these, the thermal power generated is one of the key parameters. This is directly correlated with the neutron flux close to or within the vessel. Thus, increasing the neutron flux results in an increase in the reactor's power level. Various techniques for measuring the neutron flux exist, and they are grouped together under the umbrella of neutron detectors. The development thereof has to take multiple constraints into account.

Among the most important are installation constraints. These geometric constraints are, for example, the diameter of ducts, such as thimbles or cable ducts.

In order to limit the number of detectors to be introduced into the core, operation over a measurement range of multiple decades is a clear advantage.

A single detector, instead of the usual three, then allow the neutron flux to be tracked from start-up to full power.

Another constraint relates to signal integrity. In the case of electrical transmission, which is known to be the only type used currently, the use of a shielded coaxial cable is necessitated, in order to be protected from electromagnetic interference or potential crosstalk issues between the signal transmission lines themselves.

In addition, the high levels of radiation inside a reactor vessel, and temperatures of over 300° C. severely limit the type of neutron detector that can be used.

Detectors in the ionization chamber family which are known to be robust to the extreme conditions in such an environment are thus favored. Detectors such as scintillators or silicon-based solid-state detectors are nowhere near as reliable in this specific case.

Current ionization chambers, such as boron-coated ionization chambers or fission chambers, operate conventionally according to the principle of transducing a neutron flux into an electrical signal. This electrical transduction is performed by means of one or more pairs of electrodes biased at several hundreds of volts. The number of ion pairs collected by the electrodes is at best equal to the number of pairs of ions produced by the incident radiation, and depends on the type and on the kinetic energy of the incident particles.

As already mentioned, to obtain a usable signal, electrical transduction requires that the transmission line be electromagnetically shielded.

In addition, electrical transduction is not very satisfactory in terms of the number of measurement points that can be achieved in the presence of strict space constraints. Specifically, if the problem to be solved is that of having multiple measurement points distributed along a cylindrical channel with a diameter of 15 mm and a length of 1 m, this solution does not allow more than two measurement points to be obtained because of the diameter of the transmission line (coaxial cable with a diameter of at least 6 mm), while assuming that the diameter of the detector is at most 10 mm.

Patent application WO 2017/027679 proposes a multi-point neutron detector, of the type commercially named "Micropocket fission detector" (acronym MPFD) by the applicant. The low performance of this MPFD, in terms of signal transmission, makes it inoperable: electric field interference from the transmission lines occurs as well as inductive and capacitive crosstalk between these same transmission lines.

The principle of a new pathway separate from electrical transduction has been proposed by the inventors: see, for example, publications [1] to [5]. This principle consists in performing optical transduction by collecting the photons produced in an ionization chamber.

This solution is thus based on transducing the neutron signal into an optical signal. Specifically, when a gas is ionized by a heavy ion arising from the reaction between a neutron and an active material, such as a fissile material, an electron cascade takes place and leads to excitation, and then de-excitation, in a spectral range from the ultraviolet, at around 80 nm, to the mid-infrared between around 2000 et 3000 nm, with marked luminescence caused by emission in the infrared and near-infrared region from the atoms of this same gas. This effect is schematically shown in FIG. 1.

This luminescence produced is then collected by means of an optical fiber designed to withstand radiation, which effectively limits the spectral region to be used. Specifically, it has been shown that silica optical fibers subject to irradiation attenuate only by very little, typically a few dB/km, an optical signal whose wavelength is in the near-infrared, typically between 800 and 1100 nm: see [5].

As for the transduction of the optical signal into an electrical signal, this is carried out outside a nuclear reactor vessel by means of one or more transducers such as photodiodes, silicon-based photomultipliers, or cameras.

That being said, while the aforementioned publications [1] to [5] demonstrate the proof of concept of tracking neutron fluxes using a passive optical method, they do not make any proposals to address the need for a compact multipoint measurement device.

There is therefore a need to provide a neutron and/or gamma detection device that allows the simultaneous in-line measurement at multiple points of the neutron flux, advantageously while observing space constraints which may be strict.

DISCLOSURE OF THE INVENTION

To achieve this, one subject of the invention is a device for detecting neutrons comprising at least one sealed ionization chamber with optical transduction, which extends along a longitudinal axis (X) and comprises a plurality of optical cavities, each optical cavity accommodating the free end of an optical fiber and comprising at least one inner wall coated at least partially with at least one active material, the optical cavities being filled with a gas, preferably a pressurized gas, that is able to be ionized by an ion arising from the reaction between a neutron and the active material, each optical cavity being delimited by a cylinder that is closed at its longitudinal ends by a closing disk, the lateral inner wall of which is coated at least partially with an active material, the cylinders of the cavities adjoining one another while being centered on the longitudinal axis (X), at least one of the cylinders of the cavities being pierced laterally with an opening, which is designed to allow through one of the optical fibers whose free end is accommodated in an adjacent cavity.

The ionization chamber is preferably pressure-tight, typically for a pressure of a few bars. The filling gas is advantageously a noble gas, such as argon, or a mixture of noble gases.

The active material may be a fissile element or boron.

According to one advantageous embodiment, the device comprises:
- a cylindrical body of central axis (X) delimiting on the inside the ionization chamber and a connection chamber axially adjoining the ionization chamber, the connection chamber being pierced with an opening which is designed to allow through a multifiber optical cable comprising a number of optical fibers at least equal to the number of cavities;
- a seal-tight passage partition device, arranged between the ionization chamber and the connection chamber, designed to allow through the optical fibers whose free ends are each accommodated in an optical cavity.

The connection chamber provides for the multifiber optical cable to pass out of the detector and ensures robust mechanical rigidity of the junction between the multifiber cable and the ionization chamber. It is possible for this chamber not to be seal-tight with respect to external pressure and in that case no sealing is required.

The seal-tight device for the passage of the bundle of fibers through the wall separating the connection chamber and the ionization chamber is made in such a way that the latter remains sealed.

One advantageous variant embodiment of the seal-tight passage device consists of a grouping of optical fibers previously brazed together, the grouping being brazed in turn to the separating wall between the connection chamber and the ionization chamber through which it passes.

Thus, according to this variant, the fibers are first brazed together, and then the brazed assembly is brazed to the separating wall between the chambers. Brazes based on silver, copper or aluminum are preferred for operating temperatures of up to 700° C. Solders, based on tin-lead, are conceivable up to temperatures of up to 300° C.

With such a course, consisting in introducing a fiber through a lateral passage opening in a cavity adjacent to that in which the free end of the fiber is accommodated, the radius of curvature of the optical fibers is advantageously taken into account. This optimal course thus observes the mechanical constraint on a fiber related to its minimum radius of curvature, between 15 mm and 30 mm.

According to this variant, one of the disks for closing the cavity cylinder is pierced at its center with an opening which is designed to let through the free end of the optical fiber. The central positioning of the free end of an optical fiber has the effect of maximizing photon collection. Specifically, the cone of acceptance of the fiber thus maximally covers the volume of the optical cavity in which it is accommodated. Advantageously, this coverage of the cone of acceptance may be increased by placing a ball-shaped lens at the end of the fiber. In other words, this lens at the tip of the free end of the fiber increases the collection efficiency of the fiber. This optical tip forming a lens may, for example, be welded to the end of the fiber. For example, reference may be made to: https://www.thorlabs.com/newgrouppage9.cfm?objectgroup_id=13120.

According to another advantageous variant embodiment, the ionization chamber comprises a "gathering" region, without any optical cavities, in which the various optical fibers of the cable are gathered together to be distributed on the outside of the optical cavities along the lateral inner wall of the ionization chamber, in a given angular sector, until they pass through the lateral opening in a cavity cylinder.

Preferably, the axial length of the gathering region is greater than or equal to 2 cm. Thus, in order to reach the various optical cavities, the fibers are gathered together into a bundle in the gathering region, the axial length of which allows the constraint due to the radius of curvature to be observed for each of the fibers.

Advantageously, the cylinder of an optical cavity has a diameter greater than or equal to 10 mm and a height greater than or equal to 2 cm. With these dimensions, both the constraints related to the manufacturability of the detector and those due to the minimum radius of curvature of an optical fiber are observed.

According to another advantageous embodiment, at least one of the optical cavities comprises at least one separating wall arranged, preferably in a plane transverse to the X-axis, so as to measure different neutron spectral indices according to the portion of the cavity on either side of the cavity. In other words, dividing the cavity defines different effective sections for the one or more active materials, which allows neutron spectral index measurement distributed over multiple points.

Thus, the invention consists essentially of a device for detecting neutrons comprising a sealed ionization chamber with a plurality of cavities whose operation is each based on optical transduction using an optical fiber whose free end is within the cavity, which allows multipoint neutron-flux measurement, the measurement points being axially distributed. The dimensions of the cavities and the arrangement of the optical fibers may make the device very compact.

The free end of a fiber should be able to collect as many photons produced within an optical cavity as possible. Its positioning should therefore be precise. Collection will decrease with increasing distance from the entrance wall of the optical cavity. Thus, an end of the optical fiber against the entrance wall of the optical cavity in the same plane thereas ideally results in 100% collection efficiency. However, for reasons of mechanical holding of the fiber and not truncating the optical cone (solid angle), it is preferable to position the free end of the fiber at about 1 mm from the entrance aperture (opening) into the optical cavity. Thus, preferably, the free end of the optical fiber is arranged between 1 and 2 mm from the opening into the optical cavity through which it exits, and more preferably between 1 and 1.5 mm.

A miniaturized neutron detector according to the invention may be adapted so as to withstand high-temperature, high-radiation environments like those found inside an operating nuclear reactor.

Lastly, a detector according to the invention makes it possible to best observe the integration constraints with which it may be faced while maintaining an excellent signal-to-noise ratio for the multipoint neutron-flux measurements.

Another subject of the invention is a method for operating a device for detecting neutrons as described above, in which the neutron flux is measured simultaneously at multiple points of at least a portion of the plurality of optical cavities.

The invention has many applications, among which mention may be made of the following:

the simultaneous in-line measurement at multiple points of the gamma and neutron flux in a nuclear reactor;

characterizing and tracking the neutron flux not just in a nuclear reactor, whether that is an experimental reactor or a power reactor;

locating molten fuel elements during or after a serious accident (loss of cooling or power transient);

locating conditioning blockages, in particular of made colloidal plutonium, in chemical treatment processes.

Other advantages and features will become more clearly apparent on reading the detailed but non-limiting description, which is given by way of illustration, with reference to the following figures.

DETAILED DESCRIPTION

Figure 1:
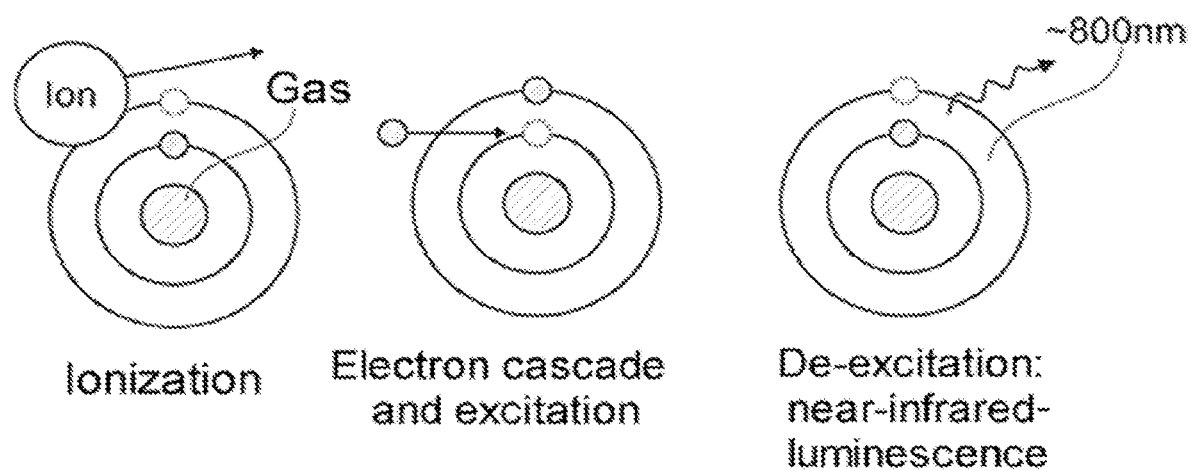
FIG. 1 is a schematic view illustrating the principle of luminescence caused by the ionization of a gas by an ionizing particle, most commonly called a heavy ion, arising from the reaction between a neutron and an active material.

FIG. 1 has already been described in the preamble. It will therefore not be discussed in detail in the below.

Figure 2:
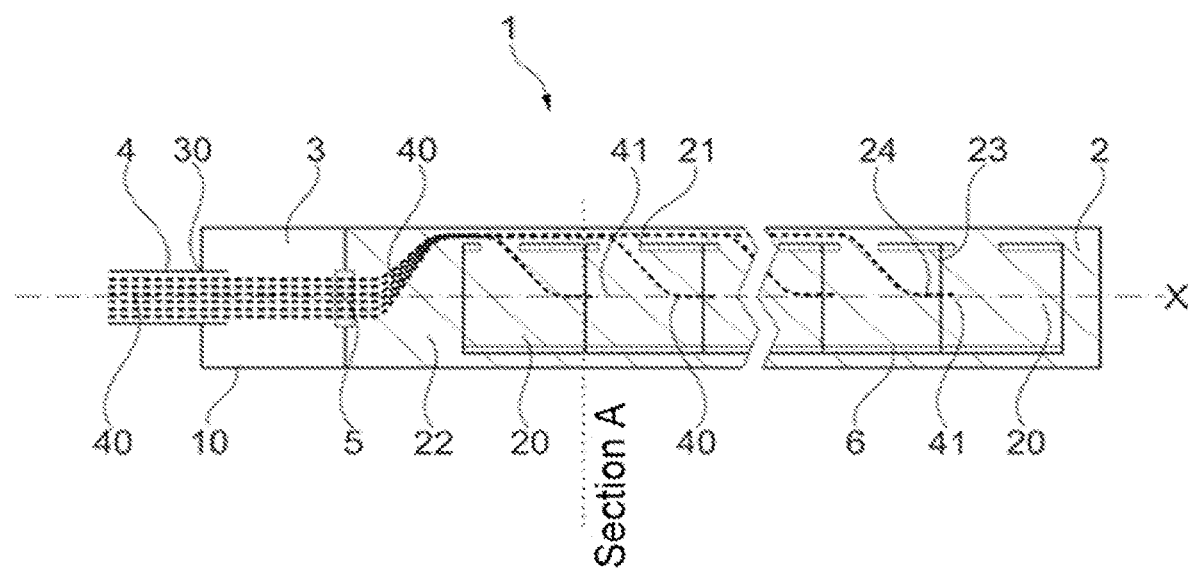
FIG. 2 is a schematic view in longitudinal section of a device for detecting neutrons according to the invention.
Figure 2A:
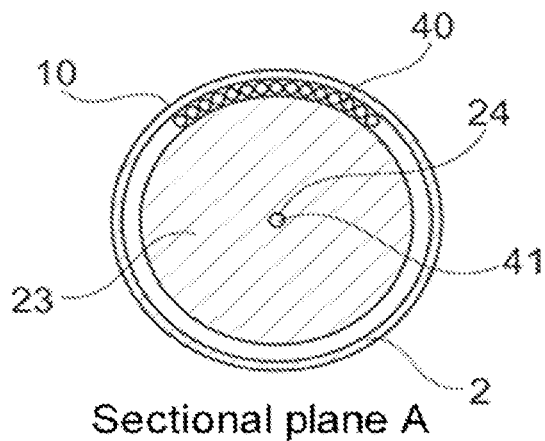
FIG. 2A is a view in cross section through plane A of FIG. 2.

FIGS. 2 and 2A show a device 1 for detecting neutrons according to the invention.

It first comprises a cylindrical body 10 of central axis (X) delimiting on the inside a sealed ionization chamber 2 with optical transduction, and a connection chamber 3 axially adjoining the ionization chamber.

The connection chamber 3 is pierced with an opening 30 which is designed to allow through a multifiber optical cable 4 comprising a number of optical fibers 40, made of silicon for example.

The passage for the bundle of fibers 40 through the separating wall between the connection chamber 3 and the ionization chamber 2 is made in such a way that the latter remains sealed.

Thus, the seal-tight passage device 5 allows the optical fibers 40 through while ensuring the seal.

The sealed ionization chamber 2 is filled with a pressurized noble gas or mixture of noble gases, this being able to be ionized by an ion arising from the reaction between a neutron and an active material 6, and comprises a plurality of optical cavities 20, which are preferably identical.

Each optical cavity 20 is delimited by a cylinder that is closed at its longitudinal ends, the lateral inner wall of which is coated at least partially with an active material 6, which may be a fissile element or boron. For example, the cylinder of the optical cavity may be made of stainless steel. The disks 21 for closing the cylinder may also be coated with an active material 6.

As shown in FIG. 2, the cylinders of the cavities 20 adjoin one another while being centered on the central, X-axis of the cylindrical body 10.

The cylinders of the cavities 20 are each pierced laterally with an opening 21, through which one of the optical fibers 40 passes.

The detection chamber 2 comprises, next to the seal-tight passage device 5, a gathering region 22, without any optical cavities, in which the various optical fibers 40 of the cable 4 are gathered together to be distributed on the outside of the optical cavities 20 along the lateral inner wall of the ionization chamber.

As shown in FIG. 2A, the distribution of the optical fibers 40 is preferably gathered together in a single angular sector parallel to the cylinders of the optical cavities 20 until they pass through a lateral opening 21.

To route an optical fiber 40 to an optical cavity 20, the disks 23 for closing the cavity cylinder are each pierced at their center with an opening 24, which lets through the free end 41 of the optical fiber 40 so that it is positioned along the central, X-axis in a given cavity 20.

Figure 3:
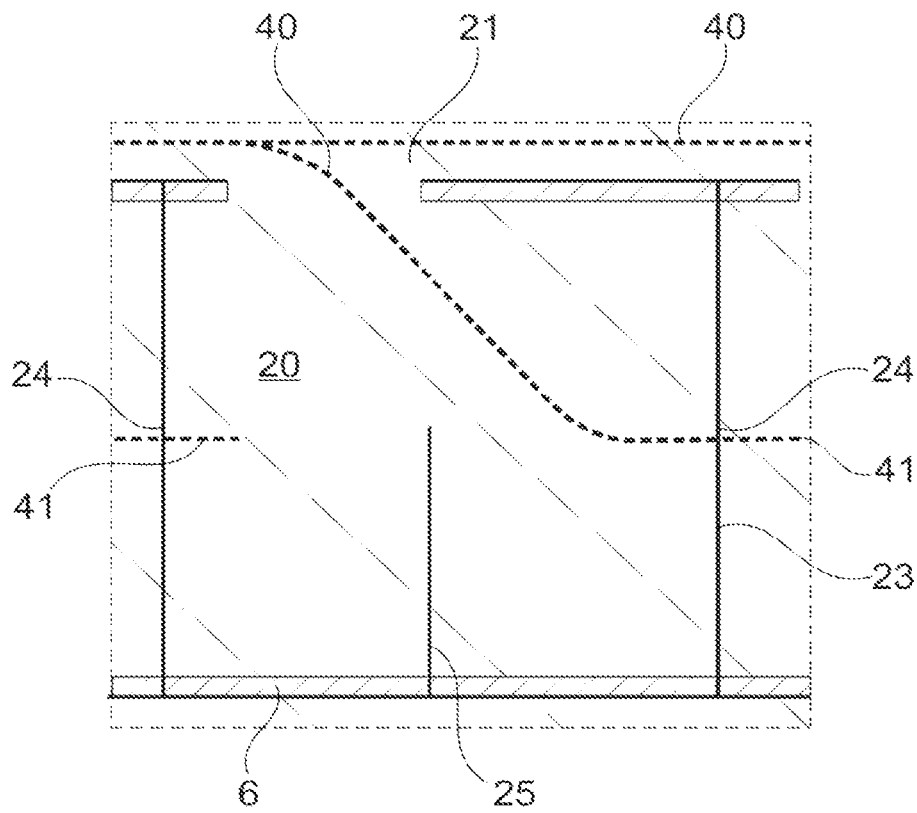
FIG. 3 is a view in longitudinal section of an optical cavity of a device according to one variant embodiment with a separating partition.

FIG. 3 illustrates a variant embodiment of an optical cavity 20 consisting of a separating wall 25 arranged arranged in a plane transverse to the X-axis. This wall 25 delimits sub-cavities in which the section of active material 6 is different. Thus, it is possible to measure different neutron spectral indices according to the sub-cavity.

Other variants and improvements may be envisioned without however departing from the scope of the invention.

While in the embodiment of FIGS. 2 and 2A the spatial distribution of the optical cavities is an axial alignment with juxtaposition between cavities, other distributions may be envisaged, such as radial distribution of the cavities which might or might not be about a central cavity.

While in the embodiment of FIGS. 2 and 2A the first cavity 20 is not functional in the sense that no optical fiber free end is accommodated therein, it is of course possible to envisage the contrary.

LIST OF CITED REFERENCES

[1]: M. Lamotte, G. De Izarra, C. Jammes, "*Heavy-ions induced scintillation experiments*," J. Instrum., 14 (09) (2019), p. C09024, https://doi.org/10.1088/1748-0221/14/09/C09024

[2]: M. Lamotte, G. De Izarra, C. Jammes, "*Development and first use of an experimental device for fission-induced spectrometry applied to neutron flux monitoring*", Nucl. Instrum. Methods Phys. Res. A953 (2020), p. 163236, https://doi.org/10.1016/j.nima.2019.163236.

[3]: M. Lamotte, G. De Izarra, C. Jammes, "*Design and irradiation test of an innovative optical ionization chamber technology*", Nucl. Instrum. Methods Phys. Res. A968 (2020), p.163945, https://doi.org/10.1016j.nima.2020.163945.

[4]: M. Lamotte, G. De Izarra, C. Jammes, SCENA: "*A simulation tool for radiation-induced gas scintillation*", Nucl. Instrum. Methods Phys. Res. A982 (2020), p. 164576, https://doi.org/10.1016/J.nima.2020.164576.

[5]: Cheymol G., Long H., Villard J.-F., Brichard B., "*High level gamma and neutron irradiation of silica optical fibers in CEA OSIRIS nuclear reactor*", IEEE Trans. Nucl. Sci., 55 (4) (2008), pp. 2252-2258.

The invention claimed is:

1. A device for detecting neutrons comprising:
at least one sealed ionization chamber with optical transduction, which extends along a longitudinal axis and comprises a plurality of optical cavities,
wherein each optical cavity accommodates a free end of an optical fiber and comprises at least one inner wall coated at least partially with at least one active material, the optical cavities being filled with a gas that is able to be ionized by an ion arising from a reaction between a neutron and the active material, wherein each optical cavity is delimited by a cylinder that is closed at its longitudinal ends by a closing disk, the lateral inner wall of which is coated at least partially with an active material, the cylinders of the cavities adjoining one another while being centered on the longitudinal axis, at least one of the cylinders of the cavities being pierced laterally with an opening, which is configured to allow through one of the optical fibers whose free end is accommodated in an adjacent cavity.

2. The device according to claim 1, comprising:

a cylindrical body of a central axis delimiting on an inside of the ionization chamber and a connection chamber axially adjoining the ionization chamber, the connection chamber being pierced with an opening which is configured to allow through a multifiber optical cable comprising a number of optical fibers at least equal to a number of cavities; and a seal-tight passage partition device, arranged between the ionization chamber and the connection chamber, configured to allow through the optical fibers whose free ends are each accommodated in one of the optical cavities.

3. The device according to claim 2, wherein the seal-tight passage partition device consists of a grouping of optical fibers previously brazed together, the grouping being brazed in turn to a separating wall between the connection chamber and the ionization chamber through which it passes.

4. The device according to claim 1, wherein one of the disks for closing the cavity cylinder is pierced at its center with an opening which is configured to let through the free end of the optical fiber.

5. The device according to claim 1, wherein the ionization chamber comprises a gathering region, without any optical cavities, in which various optical fibers are gathered together to be distributed on the outside of the optical cavities along the lateral inner wall of the ionization chamber, in a given angular sector, until the various optical fibers pass through the lateral opening in a cavity cylinder.

6. The device according to claim 5, wherein an axial length of the gathering region is greater than or equal to 2 cm.

7. The device according to claim 1, wherein the cylinder of an optical cavity has a diameter greater than or equal to 10 mm and a height greater than or equal to 2 cm.

8. The device according to claim 1, wherein at least one of the optical cavities comprises at least one separating wall arranged so as to measure different neutron spectral indices according to a portion of the cavity on either side of the cavity.

9. A method for operating a device for detecting neutrons according to claim 1, in which a neutron flux is measured simultaneously at multiple points of at least a portion of the plurality of optical cavities.

10. The device according to claim 1, wherein the at least one separating wall is arranged in a plane transverse to the longitudinal axis.

* * * * *